Aug. 5, 1969  G. HAINKE  3,459,524
APPARATUS FOR PRODUCTION OF ARMORED SHEET GLASS
Filed Oct. 2, 1963  3 Sheets-Sheet 2
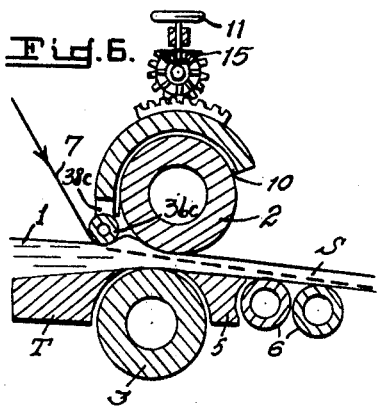
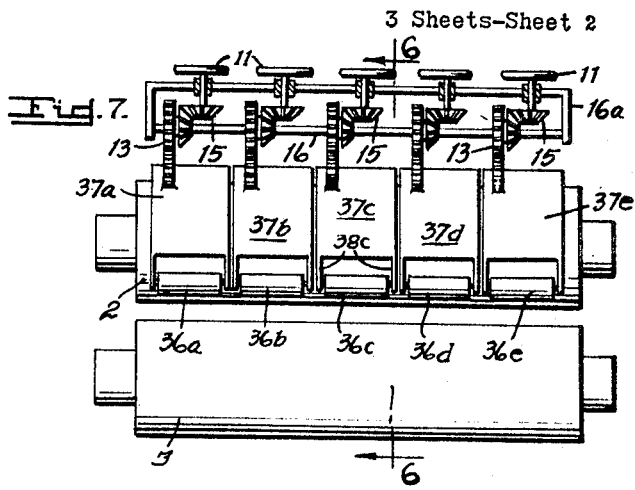
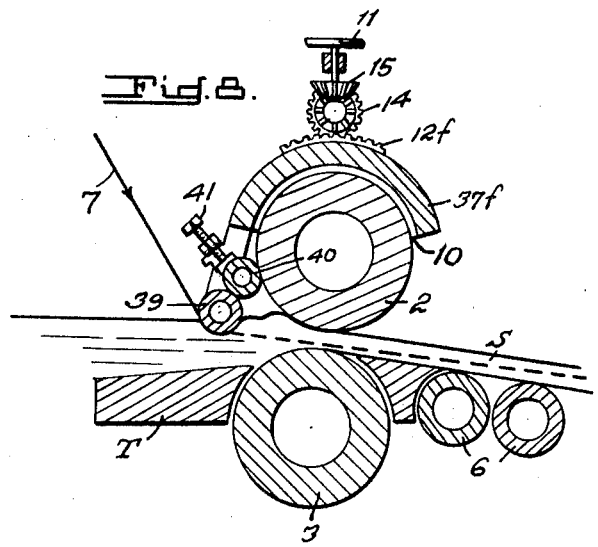
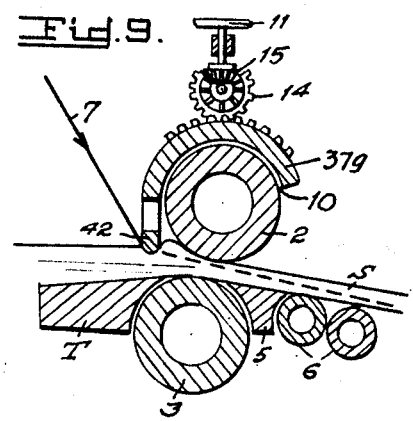
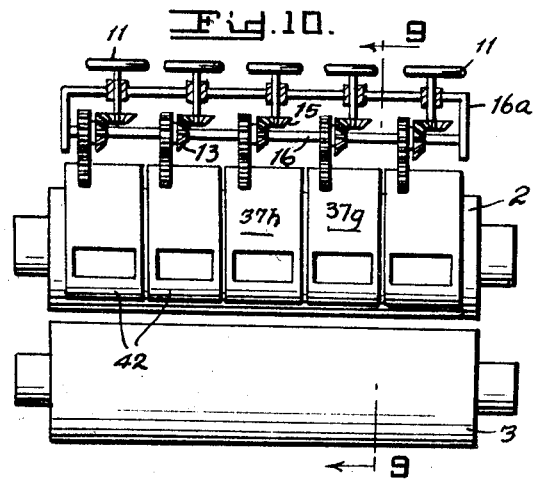
INVENTOR,
Georg Hainke
BY
Buey and Seymour
ATTORNEYS

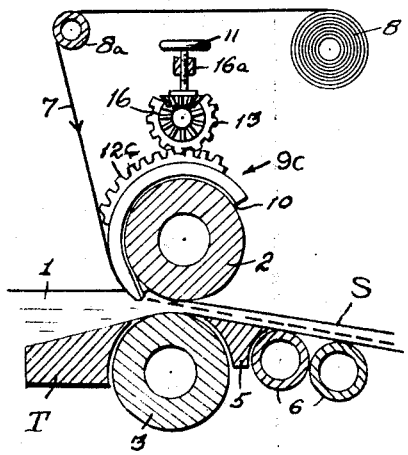
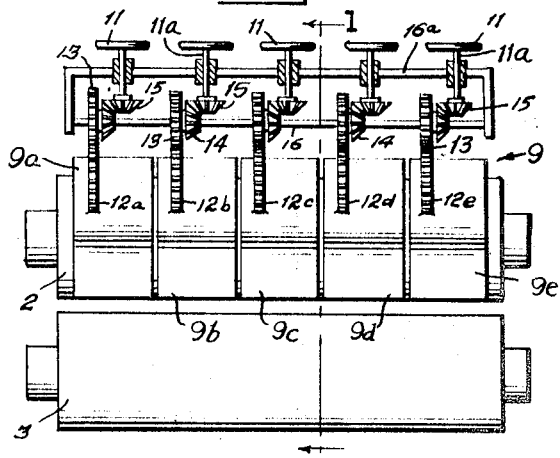
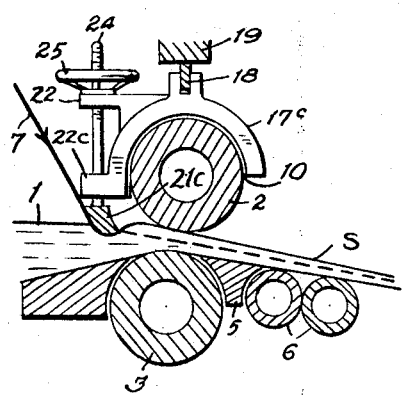
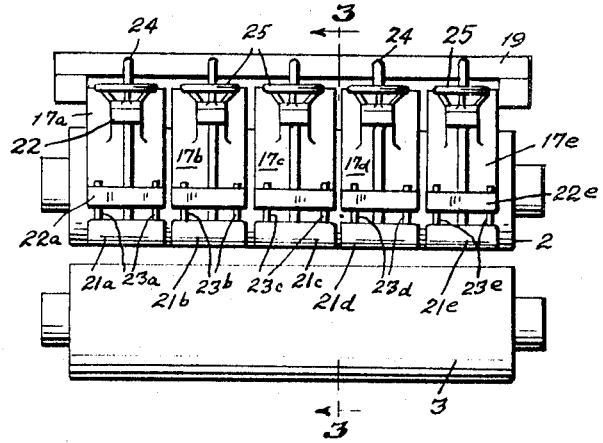
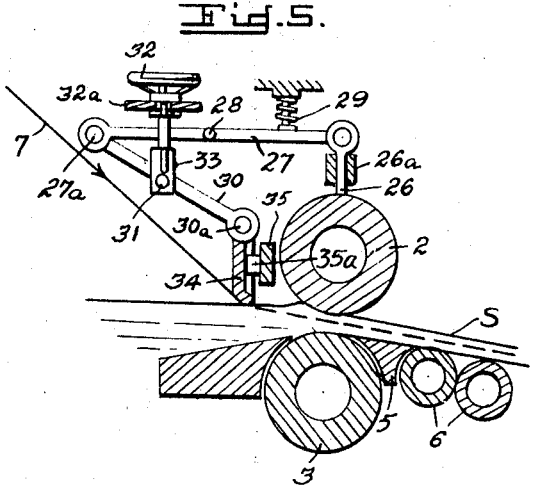

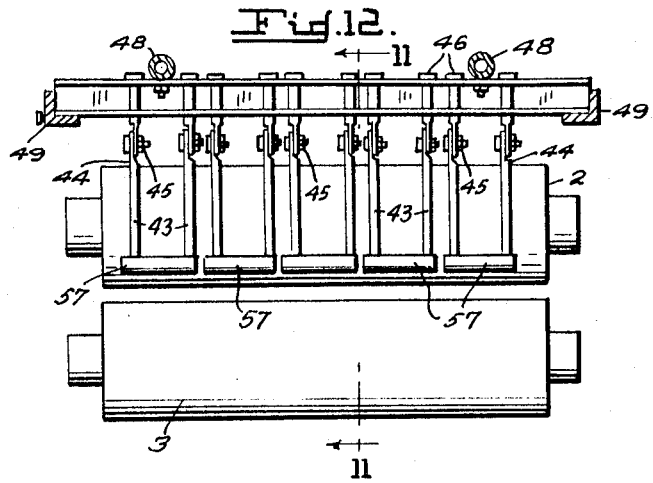
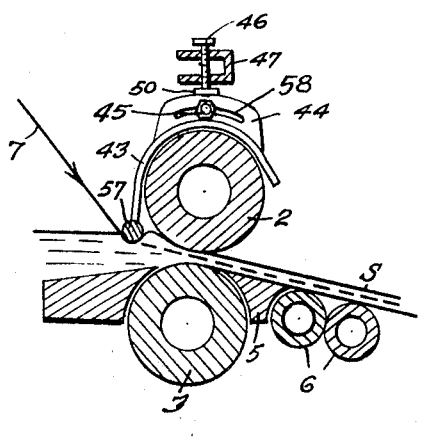
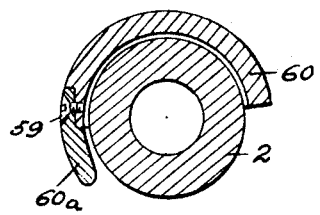
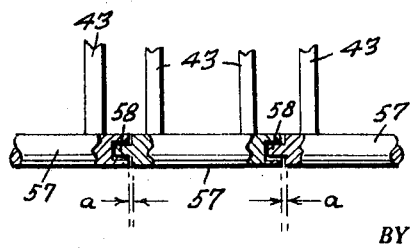

United States Patent Office 3,459,524
Patented Aug. 5, 1969

3,459,524
APPARATUS FOR PRODUCTION OF ARMORED SHEET GLASS
Georg Hainke, Stolberg, Rhineland, Germany, assignor to Compagnie de Saint-Gobain, Neuilly-sur-Seine, France
Filed Oct. 2, 1963, Ser. No. 313,366
Claims priority, application France, Oct. 5, 1962, 911,443
Int. Cl. C03b *13/12;* C03c *27/02*
U.S. Cl. 65—150                                  12 Claims This invention relates to a method of and apparatus for the manufacture of armored or reinforced sheet glass by the continuous procedure of introducing a metal reinforcement into the grass as it is drawn into the form of a sheet. As will appear more clearly hereinafter, the invention makes it possible to utilize various kinds of types of metal reinforcement such as woven wire or individual discrete filaments or wires in parallel, laterally-spaced relation.

In a known prior art procedure the glass sheet is drawn from a melting tank or source, by and between two superposed cylinders or rollers and the reinforcement is introduced into the glass melt immediately before it enters between these two rollers. The guiding means for the reinforcement is in contact therewith and guides it to determine its position within the completed sheet, that is, its position with respect to the surfaces of the sheet. Such guide means may have the form of a rigid plate, a cross bar or a roller and, by the nature of its use and purpose, is located closely above the glass melt or is dipped in the glass melt.

The molten glass as drawn has a temperature range of about 1050° to 1200° C., so that any mechanism near or adjacent the glass as drawn unavoidably becomes highly heated. The high temperature thus imposed upon any mechanism adjacent the glass melt causes deformation and distortion thereof, as well as of the rollers themselves; and this is particularly true of the member for guiding member has a relative great length. While, theoretically it is possible to reduce the working temperature of these parts by cooling them with a coolant fluid such as water, this expedient is of limited utility because it effect an undesirable and deleterious reduction in the temperature of the glass before the reinforcement has been introduced into and properly positioned within the sheet.

It is desirable in all cases and highly necessary in cases where the sheet is to be completed by grinding and polishing, that the armor or wire reinforcement be embedded accurately and uniformly in and between the two surfaces of the sheet. Usually but not necessarily, the desired position of the reinforcement is midway between the two surfaces. However, the aforesaid warping or distortion of the guilding means resulting from its high working temperature make it difficult to emplace the reinforcement in uniform spacing from the face of the completed sheet. In some areas reinforcement may be too close to one surface and in others too close to the opposite surface.

While such imperfections may be tolerated in certain classes or grades of reinforced glass, they are not permissible in high quality glass which is to be ground and polished. In such glass, as where the armor is too close to one surface, it may be exposed by the removal of glass in the grinding and polishing operations. Such glass obviously must be discarded.

The present invention overcomes and obviates the difficulties and drawbacks of prior art installations, as described in the preceding paragraphs. It assures the continuous fabrication of metal-reinforced glass wherein the position of the reinforcement between the two surfaces of the sheet is highly uniform and accurate throughout the length and breadth of the sheet. The present invention resides broadly in that the metal reinforcement being fed or introduced into the plastic glass, is maintained at constant distance from the upper surface of the sheet being formed, independently of deformations or distortion which may be created in the upper roller and in the mechanism for guiding reinforcement, by the intense heat to which they are subjected. More particularly, a plurality of discrete guiding means are established at positions spaced along the upper roller, that is, transversely of the sheet being formed; and at each discrete guiding member means are provided to control automatically the vertical position of the guiding member with respect to the corresponding section of the upper roller; furthermore at each guiding member means may be provided to adjust the guiding member at that position, independently of the automatic control with respect to the upper roller. The result is that the guiding means are at all times correctly located with respect to the upper surface of the sheet being formed and the reinforcement is guided uniformly and accurately into the sheet throughout the width thereof.

According to a particularly useful form of the apparatus used for carrying the disclosed method, the means for guiding the metallic reinforcement into the glass melt is formed in discrete sections along the axes of the rollers.

Each section is so mounted as to be individually movable toward and from the surface of the molten glass. The vertical movement of each section of the guiding means is automatically controlled by the corresponding section of the upper roller itself in accordance with any distortion thereof. By the automatic control of the position of each section by the upper roller itself, the guiding edge formed conjointly by the discrete sections is maintained always parallel with the axes of the upper roller. Furthermore, vertical adjustment of the guide sections may be effected independently of the automatic control by the upper roller. Such adjustment may be necessary, for example, in the initial calibration of the machine and when any variations or corrections in the position of the reinforcement within the glass are desired.

It is therefore an object of the invention to provide a method of and apparatus for the production of armored sheet glass, which assures accurate and positive control of the reinforcement as it enters the molten glass being formed into a sheet. Another object is to provide a method of an apparatus for the production of armored sheet glass that assures accurate precise positioning of the reinforcement in and with respect to the surfaces of the completed sheet.

Yet another object is to provide an apparatus of the type aforesaid which is effective automatically to control the positioning of the reinforcement as it enters the glass, to correct for faulty or incorrect placement otherwise caused by thermal distortion or expansion of the rollers between which the sheet is formed.

Yet another object is to provide an apparatus as aforesaid which is readily adjustable for control of the final desired accurate positioning of the reinforcement within the completed sheet.

A further object is to provide an apparatus of the type described which is versatile in its adaptability without substantial change, to various kinds and types or metal reinforcements.

Other objects and advantages of the invention will become apparent to those skilled in the art, after a study of the following detailed description, in connection with the accompanying drawing.

In the drawing:
FIGURE 1 is a vertical cross section of one form of the invention and taken in a plane substantially as identified by line 1—1, FIGURE 2;
FIGURE 2 is an elevation looking from the left, FIGURE 1;
FIGURE 3 is a vertical section corresponding to FIG- URE 1 but showing a second form of the invention in a plane identified by line 3—3, FIGURE 4;

FIGURE 4 is an elevation corresponding to FIGURE 3, looking from the left and with the melting tank omitted for clarity of illustration;

FIGURE 5 is a vertical section in a plane normal to the rollers, of a third form of the invention;

FIGURE 6 is a vertical section corresponding to FIGURES 1, 3, and 5, of a form wherein the means for guiding the reinforcement into the glass is in the form of a plurality of rollers, and is taken in a plane identified by line 6—6, FIGURE 7;

FIGURE 8 is a vertical section of a modification of FIGURES 6 and 7 wherein the guide rollers are positively driven at the same peripheral speed as the forming rollers;

FIGURE 9 is a vertical section in a plane indicated by line 9—9, FIGURE 10, and showing a form of the invention wherein the guide means are bars or rods;

FIGURE 10 is an elevation looking from the left in FIGURE 9;

FIGURE 11 is a vertical section taken in a plane identified by line 11—11, FIGURE 12, of a modified form of guide adjusting means;

FIGURE 12 is an elevational view corresponding to FIGURE 11 and looking from the left thereof;

FIGURE 13 shows a cross section through one roller and guide means having a detachable and replaceable edge; and FIGURE 14 is a view showing a construction wherein the several guide sections are articulated together in end-to-end relation.

Referring in detail to the drawing, particularly to FIGURES 1 and 2, 1 identifies a mass of molten glass in melting tank T and from which glass is being drawn continuously by and between lower roller 3 and upper roller 2, to form a sheet S which passes immediately to and over a support 5 and rollers 6. At the same time, metal reinforcement 7 is being drawn from a supply roll 8, horizontally to and about an idler roller 8a, thence downwardly and forwardly to and about guide means generally identified at 9c. It is this guide means which determines the position of the reinforcement as it enters the plastic glass and passes between rollers 2 and 3.

In the model shown there are five identical guide means, 9a, 9b, 9c, 9d and 9e in side-by-side relation transversely across the sheet being drawn. Each such means comprise a plate such as 9c, FIGURE 1, having a radius of curvature to fit about roller 2. The concave surface of the guide may be provided, for example, with a pair of axially-spaced fillets 10 extending in parallel relation coaxially about the center of curvature of the guide, and which engage the roller 2 and support the guide in radially-spaced relation with respect to the roller. These fillets may be made of copper, which has proved to be especially suitable, and detachably and interchangeably fixed to the guide.

Since every guide means is comparatively short and there is a little space between the means, thermal extension of the single means cannot cause any distortion of the continuous guiding edge. Furthermore every guide means is carried by the upper roller and therefore the vertical distance between the edge of the guide and the roller remains the same, so that an eventual distortion or displacement of the corresponding section of the upper roller, contacted by the guiding section, does not cause a variation of the position of the reinforcement in the glass sheet.

Each guide plate such as 9c has fixed thereto an arcuate rack or gear segment 12c. A frame 16a is fixedly mounted over roller 2 and journals a shaft 16 which thus extends over and parallel with roller 2. A plurality of pinions 13 are fixed to shaft 16 in spaced relation therealong. Each pinion is fixed to or unitary with a respective one of a plurality of bevel pinions 14. Five shafts 11a are journaled in frame 16a, invertical, horizontally-spaced relation therealong, and each has a handwheel 11 affixed to its upper end and a respective one of a plurality of bevel-gears or pinions 15 fixed to its lower end and in mesh with the corresponding one of bevel gears 14.

By this construction, rotation of a handwheel 11 effects a proportional rotation of the corresponding arcuate guides 9a, 9b, etc. Thus when a variation or adjustment of an guide section is necessary, rotation of handwheel 11 controlling the guide at that section, varies or adjusts its edge transversely with respect to the space between rollers 2 and 3. Since the edge is in continuous contact with the wire reinforcement 7 entering the plastic glass as it passes to and between the rollers, the invention makes possible a precise and accurate control of the reinforcement, so that all portions thereof along the rollers, enter and are finally emplaced in the glass at uniform depth or position between the surfaces of the completed sheet. Thus, for example, counterclockwise rotation of guide 9c as viewed upon FIGURE 1, causes the lower edge thereof to assume a position guiding the contiguous section of the reinforcement into the glass so that it has a greater or increased spacing below the top surface of the sheet S. Usually the desired position is midway between the surfaces of the sheet, but in an obvious way the invention makes it possible to form the completed sheet with the reinforcement nearer one surface than the other.

Although, of course, the dimensions of the arcuate guides 9a, 9b, etc., measured axially along roller 2, may vary, a uniform dimension of 60 cm. is satisfactory. The dimension of these guides is not necessary the same for all purposes, it may vary according to the respective requirements of the fabrication.

Furthermore, it is contemplated that, by means not shown, frame 16a itself may be mounted for precision-controlled limited adjustment about the axis of roller 2 so that all guides may, if desired, be correspondingly adjusted as a unit.

At FIGURES 3 and 4 I have disclosed a second form of the invention. In this species the rollers 2 and 3 are disposed as in FIGURES 1 and 2, and draw the glass from a source 1 in the same way. Arcuate guides 17a, 17b, 17c, 17d and 17e each has fillets 10 which contact roller 2 and maintain the guide out of direct contact with the roller. A bar 19 is shown as fixed and extends along, parallel with an above roller 2. Thids bar has flange 18 fixed with its under side and depending therefrom. The flange fits smoothly within a vertical transverse slot formed at the top enlargement of each guide, so that each may move freely a limited distance in the vertical plane through the axis of roller 2, but is prevented from movement about that axis.

Each guide 17a, etc., is formed at its rearward side with horizontal, vertically-spaced extensions 22 and 22a which have vertically-aligned apertures receiving a respective one of a plurality of vertical rods 24. Each rod has limited axial translation in and along its mounting apertures and is threaded at its top end to receive the correspondingly-threaded aperture in and centrally of a handwheel 25.

At its lower end, projecting downwardly from radial extension 22 each shaft carries a plate or guide edge 21a, 21b, 21c, 21d or 21e, having a cross section in a vertical fore-and-aft plane as shown upon FIGURE 3 for 21c. These guide edges are shown as having the same axial dimension and arranged in continuous, end-to-end relation extending substantially throughout the length of roller 2. Each edge member has a pair of pins such as at 23a for guide 21a. The pins are vertical and each is located at a respective end of the member. Each pin passes with a smooth fit into and through a corresponding vertical guide hole in extension 22a.

By the construction just described, rotation of any one of the handwheels 25 effects a vertical adjustment in one direction or the other, of the corresponding guides 21a, 21b, etc., it being understood that, as shown, all units are identical and similarly mounted and adjusted. Since the reinforcement 7 passes downwardly to and about the guide bars 21a to 21e, just before it is embedded in the plastic glass entering between rollers 2 and 3, individual adjustment of the handwheels 25 enables a very fine and precise control of the position of the reinforcement with respect to and between the two faces of the sheet being formed. As in the case of the model shown upon FIG-URES 1 and 2, the guide bars 21a, etc., may be varied in dimensions.

FIGURE 5 shows a form of the invention wherein the arcuate guide bars such as 9a, FIGURE 2, and guide supports such as 17a, FIGURE 4, are eliminated. In the species being described there is a fixed frame, not shown, to which is attached a bar 26a extending over and along roller 2, in parallelism therewith. The bar has therein a plurality of vertical holes spaced along its length. Thus, in a mode corresponding to FIGURES 2 and 4, there would be at least five such holes equally spaced along the bar.

A feeler rod 26 slidably fits each hole 26a so that its lower end contacts the surface of roller 2. At its upper end each rod 26 is pivotally connected with the contiguous end of a lever 27 pivoted midway between its ends at 28, to the frame, not shown. A spring 29 acts between a fixed abutment and the lever to urge the latter clockwise as viewed upon the figure.

An arm 30 has one end articulated at 27a to the remaining end of lever 27, so that the arm may swing in a plane normal to the axis of the roller. A bracket 33 is pivoted at 31 to arm 30 at a point mid way between the pivots at its ends. A fixed bar or plate 32a extends transversely across and above all levers 27. In the particular unit being described the aforesaid plate journals a handwheel 32 for rotation about a vertical axis. The handwheel has a threaded rod fixed therewith and depending centrally therefrom, to engage a threaded aperture in bracket 33. Thus in a manner clear from the figure an the foregoing description, adjustment of handwheel 32 in one direction or the other effects pivoting of arm 30 about pivot 27a.

A fixed guide bar 35 extends in parallel relation with and adjacent the upstream side of roller 2. This bar is provided with a plurality of spaced projections 35a extending from its rearward vertical face in uniformly-spaced relation therealong. The lower end of each arm 30 is articulated at 30a to the upper edge of a guide bar 34. This guide bar has a vertical groove in its forward face in which fits a respective one of the projections 35a, so that each guide bar has free but limited vertical translation and is fixed against side sway in the direction parallel with the axis of the roller. Of course, movement of the reinforcement 7 as it moves downwardly and forwardly to and about the guide bars, holds the latter in operative contact with projections 35a.

By the construction just described a precise vertical adjustment is afforded, of bar 34, independently of feeler or roller-contact element 26. Furthermore, since lever 27 is pivoted mid way between its ends, at 28, while arm 30 is also pivoted at its mid portion at 31, to bracket 33, vertical reciprocation of feeler 26 caused by warping, distortion or displacement of that section of roller 2 contacted thereby, effects an equal vertical displacement or translation of guide bar 34, and in the same direction. Hence if that section of roller 2 being contacted by feeler 26 is displaced upwardly, for example, to slightly increase the thickness of the sheet at that section, the guide bar 34 is also moved upwardly a like distance and thus accurately controls the position of the reinforcement relatively to the upper surface of the sheet at that section. Furthermore, by the use of handwheel 32 vertical adjustment of guide bar 34 may be effected independently of feeler 26, as might be necessary, for example, in the initial calibration of the machine.

It will be understood that although but one unit or assembly has been described in connection with FIG-URE 5, a plurality of units, for example five, will be mounted in side-by-side relation as in the devices of FIGURES 1, 2, and 3, 4, so that all guide bars are disposed in end-to-end relation extending along and throughout the length of roller 2. Thus while each of the guide bars is automatically adjusted by and in accordance with variations in the corresponding longitudinal section of the roller, it is also independently manually adjustable as required for example, by initial calibration, changes in roller size, or desired change in the final position of the reinforcement in and between surfaces of the completed sheet.

At FIGURES 6 and 7 there is shown a modification in which the rollers 2, 3 may be like those shown upon FIGURES 1 through 5, and act in a similar way to draw molten glass from supply source 1 and flatten it into a sheet. Likewise, arcuate guides 37a, 37b, etc., are supported in side-by-side relation on roller 2, by fillets 10, and are similarly individually adjustable by mechanism including respective handwheels 11. Since this mechanism as shown, is identical in construction and function with that previously described in connection with FIGURES 1 and 2, it is unnecessary to repeat the description at this point.

Each arcuate guide has a pair of extensions such as 38c, FIGURE 7, depending from its lower side edges.

The lower ends of each pair of these extensions journal between them a repsective one of a plurality of guide rollers 36a, 36b, etc. All rollers are of the same diameter and axial dimension and normally, that is, in the positions shown upon FIGURE 7, are aligned, end-to-end. Thus the armor or reinforcement as it passes downwardly and forwardly into the plastic glass, passes about and in rolling contact with the aforesaid rollers 36a, etc. Thus, in an obvious way, these rollers reduce friction between the armor and guides while, at the same time, assuring accurate and precise control of the positioning of the armor within the completed sheet, as in the species previously described.

FIGURE 8 shows a modification of the structure just described in connection with FIGURES 6 and 7. The arcuate guide members, one of which is identified at 37f, are shaped and mounted as before, for angular adjustment on and about the axis of roller 2, by means of the previously-described handwheels 11, bevel gears 14, 15, and gear or rack segments such as 12f, each fixed to a respective guide.

As in FIGURES 6 and 7, each guide member journals an anti-friction guide roller 39 between arms or extensions depending from its lower side edges. In addition an idler roller 40 is journaled between each pair of arms and is so mounted as to be adjustable into contact with roller 2 and the respective guide roller 39. Thus in a way clear from inspection of FIGURE 7, roller 2 acts to transmit torque through idler 40 to roller 39 so that the latter is positively driven at the same peripheral speed as roller 2. Thus, reinforcement 7 passes without friction, downwardly to and about roller 39 and into the plastic glass. Each idler 40 is mounted for translation by any suitable mechanism such as that indicated generally at 41. The construction and arrangement are such that each idler 40 may be moved into tangential line contact with rollers 2 and 39 with the necessary pressure, for all positions of each corresponding guide roller 39 as effected by actuation of its handwheel 11. In the construction shown, idler 40 is journaled in a U-shaped frame guided for translation between the extensions or arms of guide such as 37f, and moved by engagement of the bight portion of the frame with an adjusting screw identified at 41.

FIGURES 9 and 10 depict a further modified form of the invention wherein the arcuate guides such as 37g are of the same general construction as described in connection with FIGURES 6, 7 and 8, and are similarly mounted and adjusted. However the depending pair of arms of each guide are interconnected at their lower ends by a cross bar 42. These bars may be of relatively small diameter and in operation may be completely immersed in the plastic glass.

In all of the figures and species described up to this point the means for mounting and angularly adjusting the arcuate guides on and relatively to upper roller 2 are essentially the same. FIGURES 11 and 12 show a form of mounting and adjusting means for guiding the armor or reinforcement into the molten glass which is simple and inexpensive to construt but effective and efficient in use. In this form each guide member 57 of which five are shown is supported adjacent its ends by a respective pair of rods 43 bent to extend upwardly over and to fit about a roller 2. At its top portion each aforesaid rod 43 has fixed thereto an upstanding tongue 44 having therein a slot 58 extending coaxially about the axis of roller 2. A bar or channel 47 is supported at its ends by members 49 over and in parallel relation with roller 2. This bar has a plurality of vertical transversely-spaced bores therethrough. A respective one of a plurality of rods or spindles 46 slidably fits each of the aforesaid bores. Each rod has a headed upper end and a flattened lower end, pierced to receive a bolt 45 which also extends through a slot 58 in the corresponding tongue 44. Thus by loosening the nuts on a pair of bolts 45, the corresponding reinforcement guide 57 may be adjusted in its position with respect to roller 2, by angularly sliding the rods 43 along the bolts. Tightening of the nuts then locks the guide in adjusted position. Each guide 57 may be similarly mounted and adjusted independently of the others. Rings 48 fixed in spaced relation on and along channel 47 enable the entire assembly to be conveyed to the place of use, suspended over roller 2 and then lowered into the position shown.

Where the reinforcement is in the form of separate wires or strands, in transversely-spaced, longitudinally-extending position, the aforesaid guides may be grooved or channeled at the proper locations spaced axially along the roller. Where guide rollers such as 36a, etc., FIGURES 6 and 7 are employed, each of grooves will, of course, be circular and extend completely about the periphery of its roller. There may thus be several axially-spaced grooves in each roller such as 39.

FIGURE 3 shows a form of arcuate guide 60 having a guiding edge or lip 60a which is removable and replaceable. As shown, the interengaging surface of the body portion of the guide, and it lip, are rabbetted and held together by machine screw. This feature is, of course, adaptable to use in the species of FIGURES 1 and 2, as well as the other species disclosed.

FIGURE 14 shows a species wherein the guide sections 57, which may be the same as depicted upon FIGURE 11, are loosely interconnected in end-to-end relation. Thus, each section may have a trunnion 58 projecting axially from one end, and an axial bore in its other end. Each bore is sized to receive the trunnion of the next adjacent guide section, with a loose fit so that the sections, while interconnected, are free for the necessary limited individual adjustment required by thermal expansion of the guide sections or eventual distortion of roller 2. As shown, the guide sections have a small end-to-end spacing indicated at "a."

I have thus disclosed an apparatus fulfilling all of the objects stated herein and which enables the precise control of the final emplaced position of the reinforcement within and relatively to the upper face of the glass sheet and at all sections transversely across the sheet.

It will be understood that the species disclosed are to be taken in an illustrative rather than a limiting sense, and that numerous modifications and substitutions are possible and are reserved, within the scope of the subjoined claims.

Having fully disclosed the invention, what I claim and desire to secure by Letters Patent is:

1. In an apparatus for the production of glass sheets having reinforcement embedded therein, comprising, upper and lower horizontal spaced rollers adapted to draw molten glass from a source and flatten it into a sheet while drawing reinforcement for embedding into the glass as it enters between said rollers, a plurality of discrete guides having lower edges substantially aligned to extend conjointly along and parallel with said upper roller and about which reinforcement passes in contact as it enters into the glass, and means operable to selectively and individually move each said guide to adjust its edge transversely with respect to the space between said rollers.

2. The apparatus of claim 1, each said guide comprising a plate curved to fit over and about said upper roller to be supported thereby, and having a lower guide edge about which the reinforcement passes in contact just prior to entry into the glass and passage between said rollers, and means operable selectively and individually adjust each said guide angularly about the axis of said upper roller.

3. The apparatus of claim 2, said lower guide edge of each said guide plate being detachably secured to its respective plate.

4. The apparatus of claim 2, each said guide including a plurality of parallel, axially-spaced fillets protruding from its convex face, to thereby support each respective guide out of direct contact with said upper roller.

5. In apparatus for the manufacture of reinforced sheet glass, upper and lower horizontal, vertically-spaced rollers adapted to draw molten glass from a source and to form the same into a sheet between them, a plurality of arcuate guides each supported by and upon said upper roller and angularly adjustable about the axis thereof, said guides being in end-to-end contiguous relation along the length of the roller and each having a lower guide edge about which the reinforcement passes just prior to its entry between rollers, and means operable to positively adjust each said guide independently of the others, to vary the vertical position of its lower guide edge with respect to said upper roller.

6. The apparatus of claim 5, all said guides being also controllably adjustable as a unit about the axis of said upper roller.

7. In an apparatus for producing armored sheet glass, upper and lower, horizontal, spaced rollers for drawing molten glass from a source and forming it into a sheet between them, a plurality of discrete guide elements each mounted on and extending arcuately about said upper roller in side-by-side relation, each said guide element including an edge radially spaced from said upper roller and about which a predetermined portion of the armor passes in contact as it enters into the glass and between said rollers, and means operable to individually and separately adjust each said guide element to move said edge parallel with the plane through the axis of said rollers.

8. In apparatus for producing armored sheet glass, comprising, upper and lower horizontal, vertically-spaced rollers to draw molten glass from a source and flatten it between them into a sheet, while drawing metal armor to and embedding the same in the glass just prior to passing between said rollers, a plurality of discrete guide sections each having a lower guide edge, said sections being disposed adjacent and upstream from said upper roller to conjointly define a substantially continuous guide edge parallel with and spaced from said upper roller, means mounting each said section for vertical translation to vary its position substantially parallel with a plane through the axes of said rollers, a plurality of feelers, means mounting each said feeler for vertical translation with one end in contact with a respective portion of said upper roller in spaced relation along the axis thereof, and means connecting each said feeler with a respective one of said guide sections, to automatically adjust each said guide section directly in correspondence with radial distortions of said upper roller contacted by the respective one of said feelers.

9. The apparatus of claim 8, said last-named means comprising a plurality of main levers each pivoted between its ends to a fixed support and pivotally connected at one end with a respective one of said feelers, a plurality of auxiliary levers each pivoted between its ends for vertical adjustment, each said auxiliary lever being connected at its ends to a respective one of said guide sections and the remaining end of a respective one of said main levers, and means yieldingly urging each said feeler into contact with said upper roller.

10. In a mechanism for the production of metal-reinforced sheet glass, a main roller, a plurality of guide plates each arcuately curved to fit over and about said main roller in contact therewith, said plates being positioned in side-by-side relation throughout the length of said main roller, each said guide plate journaling a guide roller at the lower edge thereof, all said guide rollers being substantially aligned for rotation about a common axis parallel with said main roller, and means engaging all said guide plates and operable to individually and independently adjust each said guide plate about the axis of said main roller.

11. The mechanism of claim 10, and means positively rotating each said guide roller at the same peripheral speed as said main roller.

12. Apparatus for the continuous production of reinforced sheet glass in ribbon form, comprising, upper and lower spaced rollers between which the molten glass is passed and formed into a ribbon, a guiding member extending substantially continuously along the upper of said rollers, throughout the length thereof, said guiding member comprising a plurality of discrete sections, means mounting each said section for individual adjustment transversely of and with respect to the gap between said rollers, means responsive to radial motion of the corresponding portion of the upper of said rollers, for correspondingly adjusting the position of the respective one of said sections, transversely of and with respect to the gap between said rollers, and means conducting reinforcement to, about, and in contact with said guiding member, immediately prior to its entry between said rollers.

References Cited
UNITED STATES PATENTS

| | | | |
|---|---|---|---|
| 844,484 | 2/1907 | Wadsworth | 65—51 |
| 856,661 | 6/1907 | Shuman | 65—51 |
| 2,009,706 | 7/1935 | Schmid | 65—51 |
| 2,062,228 | 11/1936 | Lamesch | 65—51 |
| 2,873,556 | 2/1959 | Hainke | 65—32 |
| 3,183,072 | 5/1965 | Long. | |
| 3,216,810 | 11/1965 | Hainke. | |

DONALL H. SYLVESTER, Primary Examiner
ROBERT L. LINDSAY, JR., Assistant Examiner U.S. Cl. X.R.
65—51, 160